United States Patent
Hegde et al.

(10) Patent No.: US 6,925,495 B2
(45) Date of Patent: Aug. 2, 2005

(54) METHOD AND SYSTEM FOR DELIVERING AND MONITORING AN ON-DEMAND PLAYLIST OVER A NETWORK USING A TEMPLATE

(75) Inventors: Kiran Venkatesh Hegde, Redmond, WA (US); Jason Matthew Walter Kind, Shoreline, WA (US); Eric Kane Krause, Woodinville, WA (US); Raymond Edward McGrath, Bellevue, WA (US)

(73) Assignee: Vendaria Media, Inc., Seattle, WA (US)

( * ) Notice: Subject to any disclaimer, the term of this patent is extended or adjusted under 35 U.S.C. 154(b) by 747 days.

(21) Appl. No.: 09/905,738

(22) Filed: Jul. 13, 2001

(65) Prior Publication Data

US 2002/0007418 A1 Jan. 17, 2002

Related U.S. Application Data

(60) Provisional application No. 60/217,914, filed on Jul. 13, 2000.

(51) Int. Cl.[7] .............................................. G06F 13/00
(52) U.S. Cl. ....................................................... 709/223
(58) Field of Search ............................. 84/1, 600, 601, 84/602, 609; 707/100, 104.1; 709/201, 203, 223

(56) References Cited

U.S. PATENT DOCUMENTS

| 5,892,915 A | * | 4/1999 | Duso et al. ................. 709/219 |
| 6,248,946 B1 | * | 6/2001 | Dwek .......................... 84/609 |
| 6,446,080 B1 | * | 9/2002 | Van Ryzin et al. ...... 707/104.1 |

* cited by examiner

Primary Examiner—Robert B. Harrell
(74) Attorney, Agent, or Firm—Merchant & Gould P.C.; Timothy P. Sullivan

(57) ABSTRACT

The present invention delivers a playlist to a requesting device over a network and monitors their performance on the device. Attributes of the requesting device are determined to increase performance of the playlist. The attributes may include information relating to the operating system of the requesting device; a media player; a bandwidth parameter; presence or absence of a firewall, permissions related to the requesting device, and the like. Media instructions are generated that direct the performance of the playlist on the requesting device and are based on the determined attributes. The playlist is retrieved from a location on the network picked to optimize performance. The playlist may be generated in real time or may be cached and stored at various locations on a network. The performance of the playlist is monitored to help ensure the proper performance of the playlist.

20 Claims, 15 Drawing Sheets

METHOD AND SYSTEM FOR DELIVERING AND MONITORING AN ON-DEMAND PLAYLIST OVER A NETWORK USING A TEMPLATE

RELATED APPLICATION

This application claims the benefit of U.S. Provisional Application No. 60/217,914, filed Jul. 13, 2000, the benefit of the earlier filing date of which is hereby claimed under 35 U.S.C. § 119 (e).

FIELD OF THE INVENTION

The present invention relates to providing content over a network, and more specifically to providing on-demand playlist content to a requesting device over a network.

BACKGROUND OF THE INVENTION

The Internet has seen expansive growth over the last several years. Not only are there more Web sites providing a wide range of information, service, and goods, there are more users on the Internet than ever before.

Today, users may experience multimedia clips, purchase goods, access the world's news as it happens, obtain reviews on various items or products in a variety of formats, or access a variety of resources all on the Internet. For example, a user may read product reviews, view pictures of a product, or in some instances, watch a video presentation related to the product.

In order to access the available resources, however, Internet users are exposed to a variety of different media types while visiting a Web site. Not only may users access textual information, they may also view graphical images, or watch multimedia presentations, including audio and video, that may be streamed or downloaded. The steps required to access this media, however, may be overwhelming to many of the users. Not only do certain sites require users to use particular products to access the media, many sites require the user to know the configuration of their system in order to play certain media files. For example, a user may have to download a particular media player, upgrade to a different version, or know the particular programs they are using on their system. With so many available options to access and play media files, users are constantly bombarded with different requirements.

Another requirement to view many multimedia sites is a high bandwidth connection to the Internet. Many sites rely on the user having a high bandwidth when streaming media to the user. While the majority of businesses today have access to broadband, the majority of home users connect to the Internet through a low speed dial-up modem resulting in a poor multimedia experience.

SUMMARY OF THE INVENTION

According to one aspect of the invention, a playlist is delivered to a requesting device over a network. The playlist is delivered to the requesting device in an optimized manner.

According to another aspect of the invention, attributes of the requesting device are determined. The attributes may include information relating to the operating system of the requesting device; a media player; a bandwidth parameter; presence or absence of a firewall, permissions related to the requesting device, and the like.

According to yet another aspect of the invention, instructions are generated that correspond to the performance of the playlist on the requesting device. The instructions are based on the determined attributes and are optimized for the requesting device.

According to still yet another aspect of the invention, the instructions are delivered to the requesting device and a trigger is monitored to determine when to execute the instructions associated with the playlist.

According to still yet another aspect of the invention, the playlist is retrieved from a location on the network that is directed at providing optimized performance of the playlist on the requesting device. When the playlist optimized for the requesting device is cached at the location on the network, the optimized playlist is delivered to the requesting device. Otherwise, a default playlist is delivered to the device and a playlist is created that is cached for future delivery. Alternatively, the default playlist may be generated in real-time and delivered.

Still yet another aspect involves monitoring the performance of the playlist. When the playlist is performing properly the performance of the cliplets is monitored. When the playlist is not performing properly, the cliplet may be retrieved from another location on the network in order to improve performance of the playlist.

DETAILED DESCRIPTION OF THE PREFERRED EMBODIMENT

Figure 1:
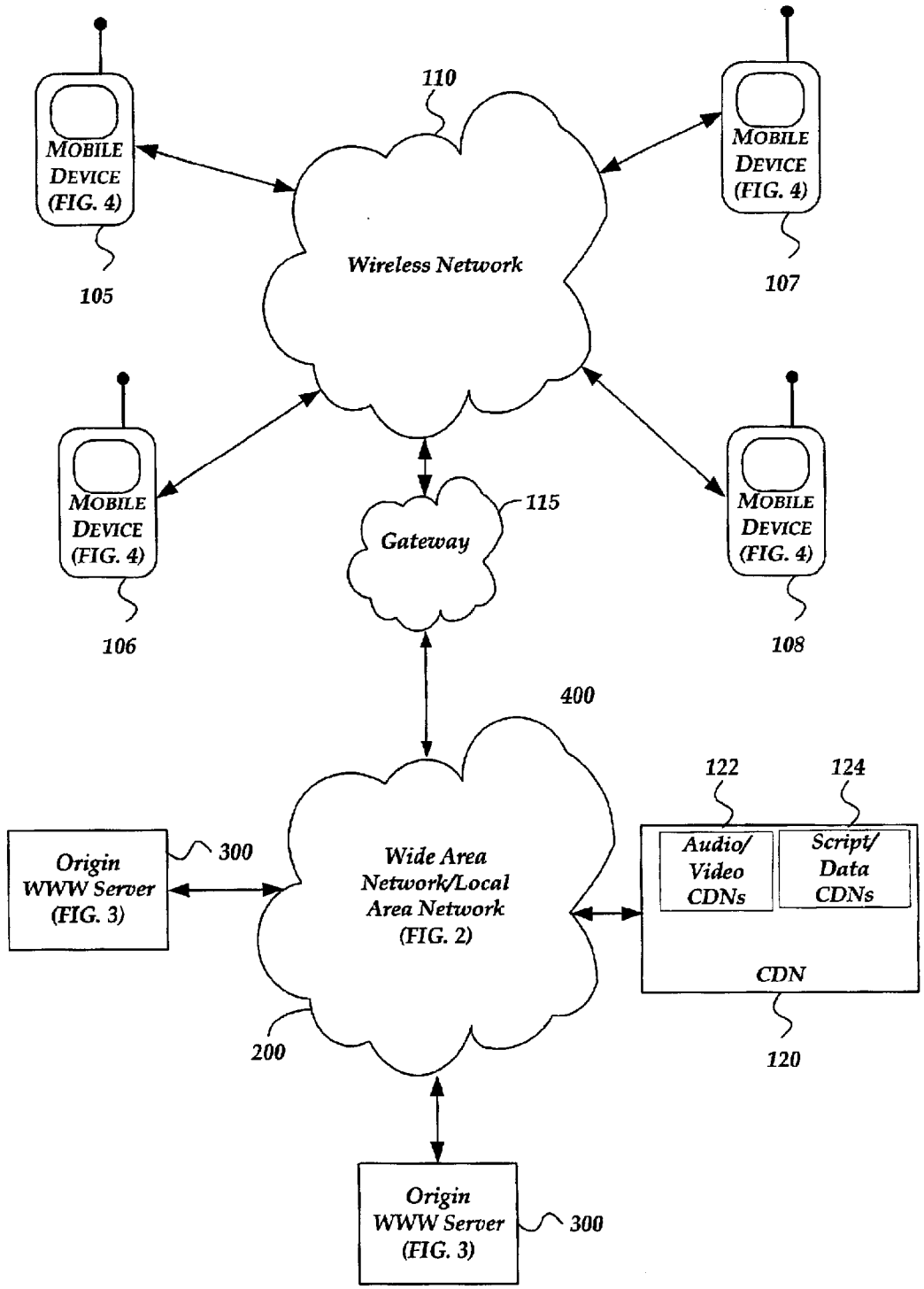
FIG. 1 illustrates a schematic diagram of an exemplary system overview.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "clip" means a piece of raw video footage that has been edited and is waiting to be encoded into a cliplet. The term "cliplet" means clips that are further encoded to supported media player formats, bandwidths, codecs, languages and frame sizes. The term "adlet" means dynamic client objects that have different programmable functions and attributes to manage a media playlist. Referring to the drawings, like numbers indicate like parts throughout the views. Additionally, a reference to the singular includes a reference to the plural unless otherwise stated or is inconsistent with the disclosure herein.

Illustrative Operating Environment

With reference to FIG. 1, an exemplary system in which the invention operates includes wireless mobile devices 105–108, wireless network 110, gateway 115, one or more content delivery networks (CDN) 120, wide area network (WAN)/local area network (LAN) 200 and one or more world wide web (WWW) origin servers 300.

Figure 4:
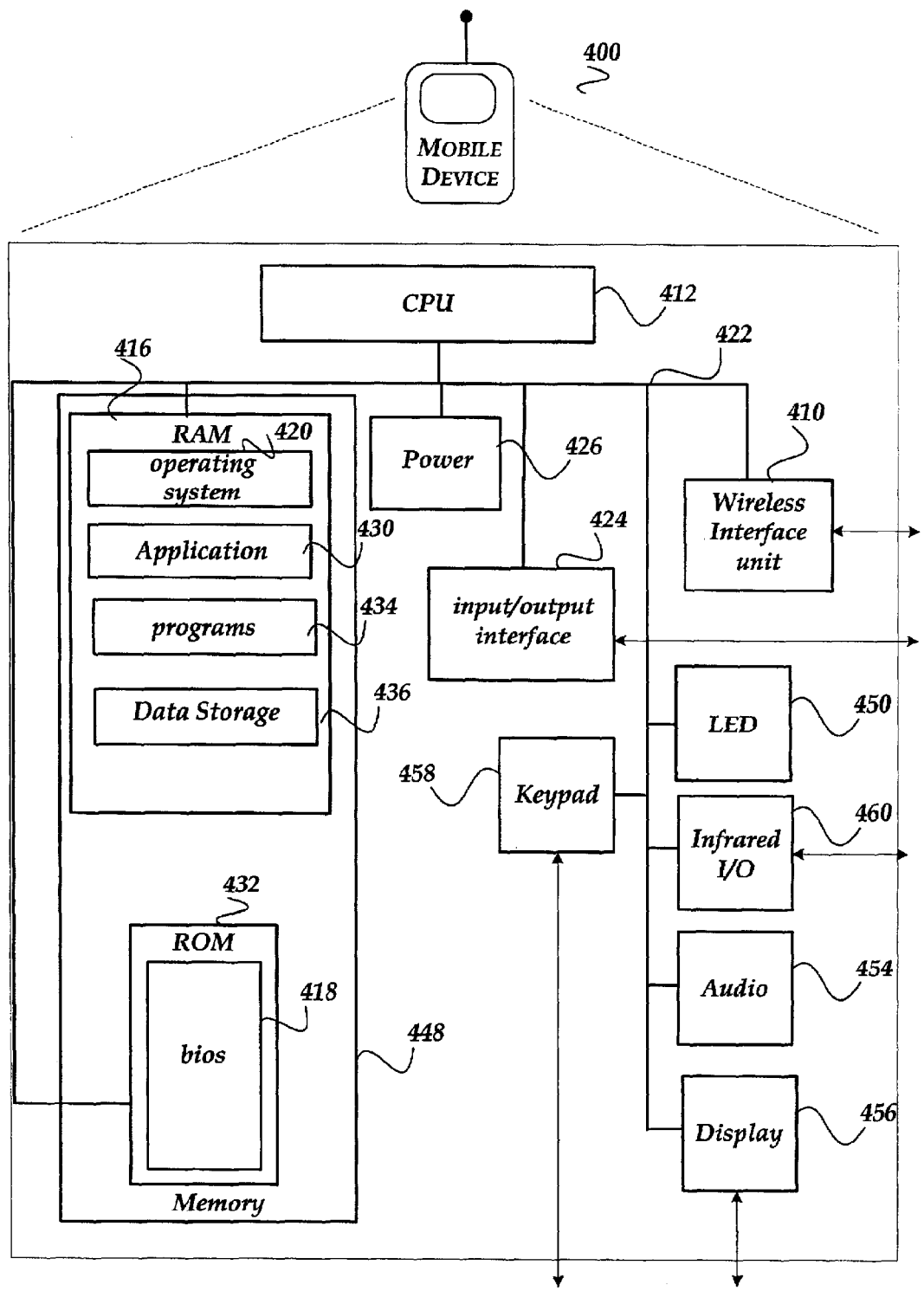
FIG. 4 shows a schematic diagram of an exemplary mobile device.

Wireless devices 105–108 are coupled to wireless network 110 and are described in more detail in conjunction with FIG. 4. Generally, mobile devices 105–108 include any device capable of connecting to a wireless network such as wireless network 110. Such devices include cellular telephones, smart phones, pagers, radio frequency (RF) devices, infrared (IR) devices, citizen band radios (CBs), integrated devices combining one or more of the preceding devices, and the like. Mobile devices 105–108 may also include other devices that have a wireless interface such as PDAs, handheld computers, personal computers, multiprocessor systems, microprocessor-based or programmable consumer electronics, network PCs, wearable computers, and the like.

Wireless network 110 transports information to and from devices capable of wireless communication, such as mobile devices 105–108. Wireless network 110 may include both wireless and wired components. For example, wireless network 110 may include a cellular tower linked to a wired telephone network. Typically, the cellular tower carries communication to and from cell phones, pagers, and other wireless devices, and the wired telephone network carries communication to regular phones, long-distance communication links, and the like.

Wireless network 110 is coupled to WAN/LAN through gateway 115. Gateway 115 routes information between wireless network 110 and WAN/LAN 200. For example, a user using a wireless device may browse the Internet by calling a certain number or tuning to a particular frequency. Upon receipt of the number, wireless network 110 is configured to pass information between the wireless device and gateway 115. Gateway 115 may translate requests for web pages from wireless devices to hypertext transfer protocol (HTTP) messages, which may then be sent to WAN/LAN 200. Gateway 115 may then translate responses to such messages into a form compatible with the requesting device. Gateway 115 may also transform other messages sent from wireless devices 105–108 into information suitable for WAN/LAN 200, such as e-mail, audio, voice communication, contact databases, calendars, appointments, and the like.

Figure 2:
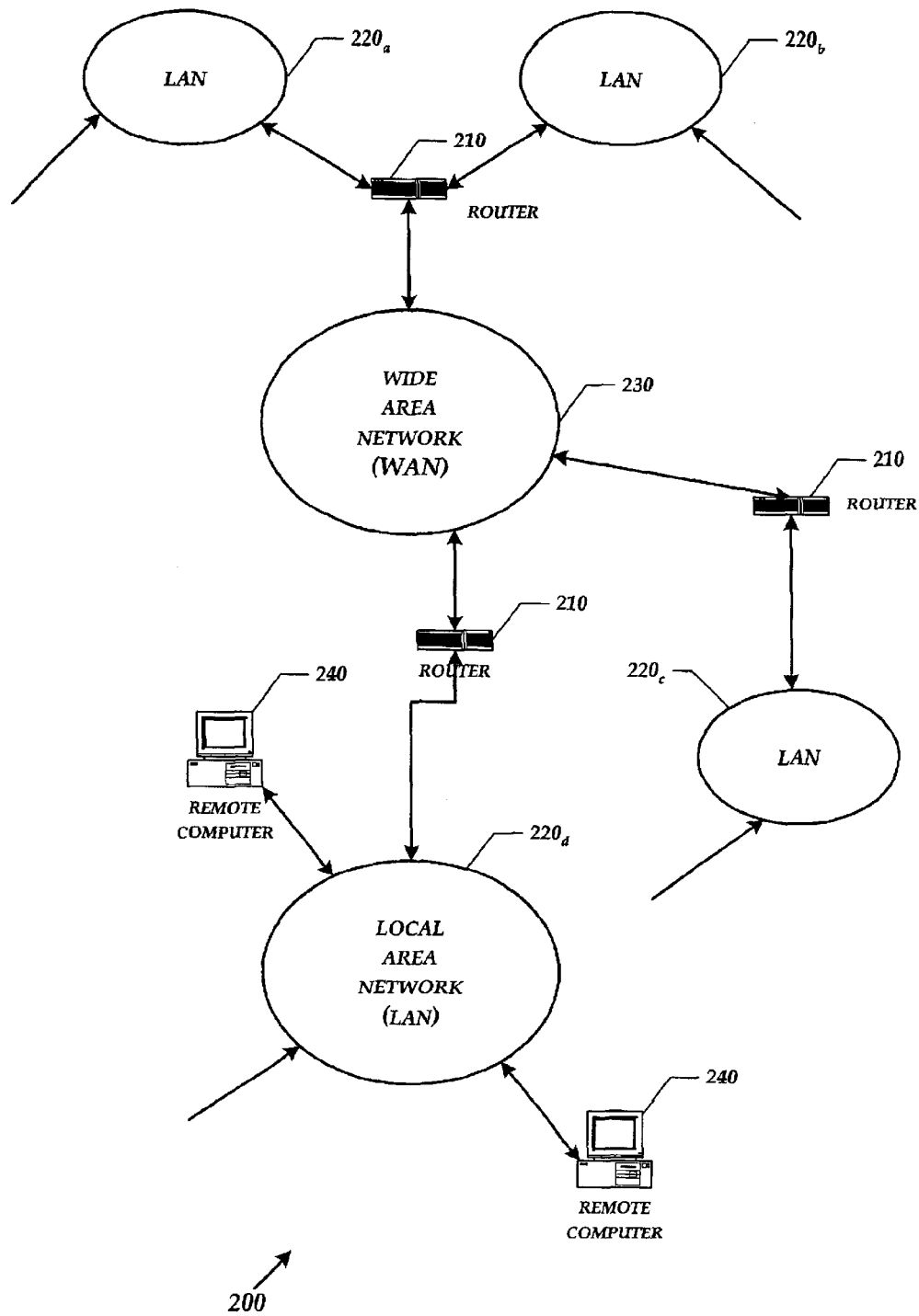
FIG. 2 shows a schematic diagram illustrating an exemplary system overview in which local area networks and a wide area network are interconnected by routers.

Typically, WAN/LAN 200 transmits information between computing devices as described in more detail in conjunction with FIG. 2. One example of a WAN is the Internet, which connects millions of computers over a host of gateways, routers, switches, hubs, and the like. An example of a LAN is a network used to connect computers in a single office. A WAN may connect multiple LANs.

Content delivery network (CDN) 120 is coupled to WAN/LAN 200 through communication mediums. CDN 120 may include many types of CDNs. For example, CDN 120 may include audio/video CDNs 122 designed to optimally deliver audio and video or script/data CDNs 124 designed to optimally deliver script or data to the requesting device. CDNs use various techniques to improve the performance of content delivery for Web sites. They may increase reliability of a web site by providing mirrored content across distributed servers and provide increased bandwidth as compared to a single server. CDNs may also employ various caching techniques to increase the end user's performance. Content may be pushed to the edges of the network to minimize delay associated with retrieving the content. Load balancing may also be used to help route a user's request for content to the best available content source. Typically, a web site subscribes to a CDN and instructs the CDN how to deliver its content. The subscribing web site may serve some content on its own avoiding the CDN and use the CDN to serve other content. While CDNs are typically used for WAN/LAN applications, the technology may be applied to intranets and extranets as well.

WWW origin servers 300 are coupled to WAN/LAN 200 through communication mediums. WWW origin servers 300 provide access to information and services as described in more detail in conjunction with FIG. 3.

FIG. 2 shows another exemplary system in which the invention operates in which a number of local area networks ("LANs") $220_{a-d}$ and wide area network ("WAN") 230 interconnected by routers 210. Routers 210 are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, it will be appreciated that the Internet itself may be formed from a vast number of such interconnected networks, computers, and routers and that an embodiment of the invention could be practiced over the Internet without departing from the spirit and scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

Figure 3:
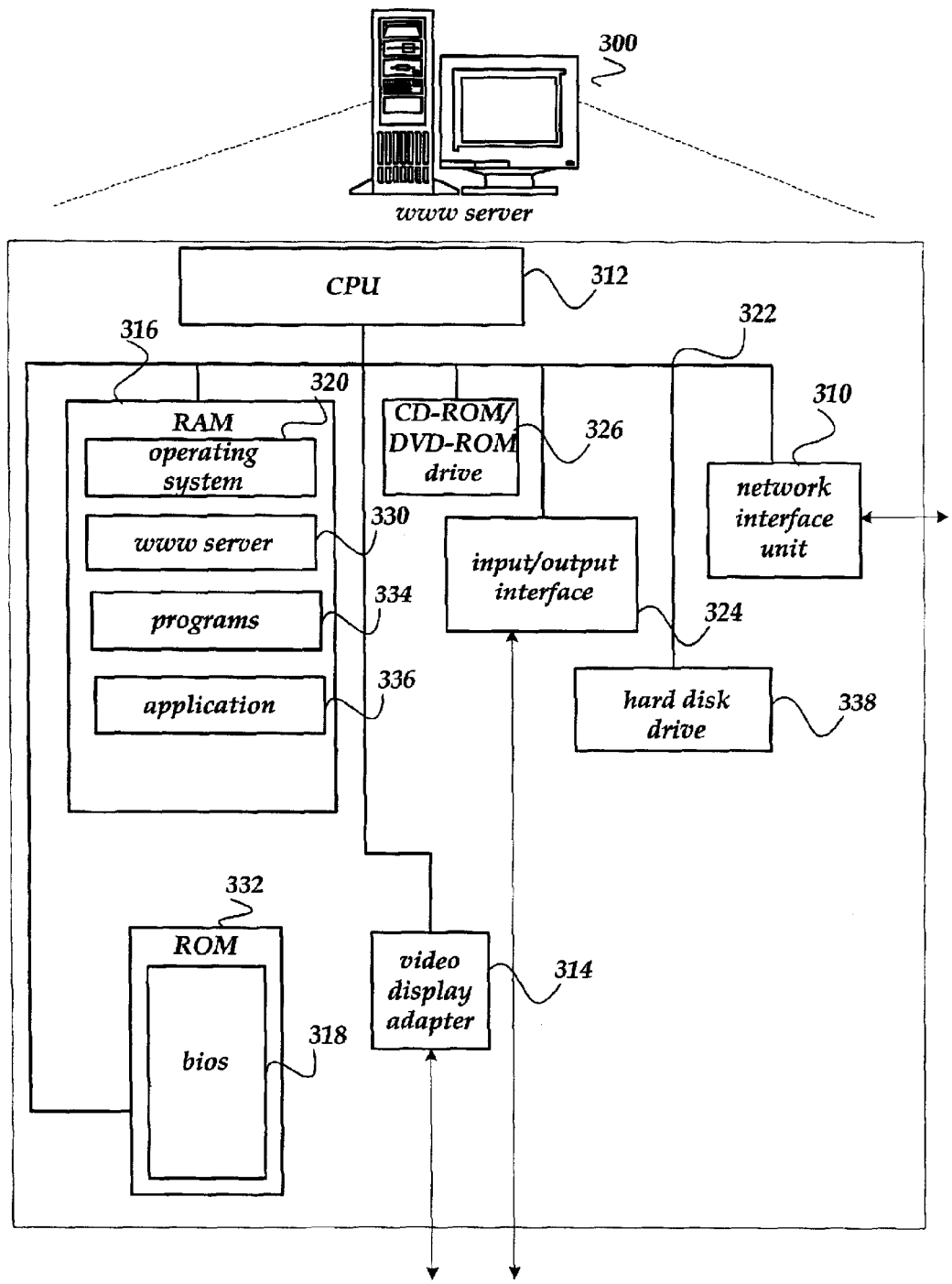
FIG. 3 illustrates a schematic diagram of an exemplary origin server that is operative to provide a web site.

A WWW origin server, as described in more detail in conjunction with FIG. 3, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 3 shows an exemplary WWW origin server 300 that is operative to provide a WWW site. Accordingly, WWW origin server 300 transmits WWW pages to the WWW browser application program executing on requesting devices to carry out this process. For instance, WWW origin server 300 may transmit pages and forms for receiving information about a user, such as user preferences, address, telephone number, billing information, credit card numbers, and the like. Moreover, WWW origin server 300 may transmit WWW pages to a requesting device that allow a user to participate in a WWW site. The transactions may take place over the Internet, WAN/LAN 200, or some other communications network known to those skilled in the art.

Those of ordinary skill in the art will appreciate that the WWW origin server 300 may include many more components than those shown in FIG. 3. However, the components shown are sufficient to disclose an illustrative embodiment for practicing the present invention. As shown in FIG. 3, WWW origin server 300 is connected to WAN/LAN 200, or other communications network, via network interface unit 310. Those of ordinary skill in the art will appreciate that network interface unit 310 includes the necessary circuitry for connecting WWW origin server 300 to WAN/LAN 200, and is constructed for use with various communication protocols including the TCP/IP protocol. Typically, network interface unit 310 is a card contained within WWW origin server 300.

WWW origin server 300 also includes processing unit 312, video display adapter 314, and a mass memory, all connected via bus 322. The mass memory generally includes RAM 316, ROM 332, and one or more permanent mass storage devices, such as hard disk drive 328, a tape drive, CD-ROM/DVD-ROM drive 326, and/or a floppy disk drive. The mass memory stores operating system 320 for controlling the operation of WWW origin server 300. It will be appreciated that this component may comprise a general purpose server operating system as is known to those of ordinary skill in the art, such as UNIX, LINUX™, or Microsoft WINDOWS NT®. Basic input/output system ("BIOS") 318 is also provided for controlling the low-level operation of WWW origin server 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a WWW site. More specifically, the mass memory stores applications including WWW server application program 330, programs 334, and on-demand content application 336 (See FIGURES and related discussion below). WWW server application program 330 includes computer executable instructions which, when executed by WWW origin server 300, generate WWW browser displays, including performing the logic described above. WWW origin server 300 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with external security applications (not shown), to send and receive private information in a secure fashion.

WWW origin server 300 also comprises input/output interface 324 for communicating with external devices, such as a mouse, keyboard, scanner, or other input devices not shown in FIG. 3. Likewise, WWW origin server 300 may further comprise additional mass storage facilities such as CD-ROM/DVD-ROM drive 326 and hard disk drive 328. Hard disk drive 328 is utilized by WWW origin server 300 to store, among other things, application programs, databases, and program data used by WWW server application program 330. For example, customer databases, product databases, image databases, and relational databases may be stored. The operation and implementation of these databases is well known to those skilled in the art.

FIG. 4 shows an exemplary mobile device 400, according to one embodiment of the invention. Mobile device 400 may be arranged to transmit and receive data. For instance, mobile device 400 may send and receive SMS text messages from other mobile devices (not shown) and servers (See FIG. 3 and related discussion) as well as receiving content, such as adlets and cliplets as described below. The data transmissions may take place over the Internet, WAN/LAN 200, or some other communications network known to those skilled in the art.

Those of ordinary skill in the art will appreciate that mobile device 400 may include many more components than those shown in FIG. 4. However, the components shown are sufficient to disclose an illustrative embodiment for practicing the present invention. As shown in the figure, mobile device 400 includes central processing unit 412, memory 448, RAM 416, ROM 432, operating system 420, application 430, programs 434, data storage 436, bios 418, power 426, input/output interface 424, wireless interface unit 410, LED 450, audio 454, display 456, keypad 458, and infrared input/output 460.

Mobile device 400 may connect to WAN/LAN 200, or other communications network, via wireless interface unit 410. Those of ordinary skill in the art will appreciate that wireless interface unit 410 includes the necessary circuitry for connecting mobile device 400 to WAN/LAN 200, and is constructed for use with various communication protocols including the TCP/IP protocol. Wireless interface unit 410 may include a radio layer (not shown) that is arranged to transmit and receive radio frequency communications. Wireless interface unit 410 connects mobile device 400 to external devices, via a communications carrier or service provider.

Mass memory 448 generally includes RAM 416, ROM 432, and one or more data storage units 436. The mass memory stores operating system 420 for controlling the operation of mobile device 400. It will be appreciated that this component may comprise a general purpose server operating system as is known to those of ordinary skill in the art, such as a version of UNIX, LINUX™, or Microsoft WINDOWS®. Basic input/output system ("BIOS") 418 is also provided for controlling the low-level operation of mobile device 400.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data used within mobile device 400. More specifically, the mass memory stores applications including on-demand content application 430, and programs 434. Programs 434 may include computer executable instructions which, when executed by mobile device 400, transmit and receive WWW pages, e-mail, audio, video, and the like. One or more programs 434 may be loaded into memory 448 and run under control of operating system 420. On-demand content application 430 performs the methods described below. Examples of application programs include radio tuner programs, phone programs, communication programs, productivity programs (word processing, spreadsheet, etc.), browser programs, and the like. Mobile computing device 400 also includes ROM 432. ROM 432 may be used to store data that should not be lost when mobile device 400 loses power.

Mobile device 400 also comprises input/output interface 424 for communicating with external devices, such as a headset, or other input or output devices not shown in FIG. 4. Data storage 436 is utilized by mobile device 400 to store, among other things, application programs, databases, and program data used by the mobile device broadcast delivery application. For example, user databases, product databases, image databases, and relational databases may be stored. The operation and implementation of these databases is well known to those skilled in the art.

Keypad 458 may be any input device arranged to receive inputs from a user. For example, keypad 458 may be a push button numeric dialing, or a keyboard. Display 456 may be a liquid crystal display, or any other type of display commonly used in mobile devices. Display 456 may also be a touch screen arranged to receive a users inputs. Infrared input/output 460 may be used to send and receive infrared commands.

Power supply 426 provides power to mobile device 400. According to one embodiment, a rechargeable battery provides power. The power may be also be provided by an external power source, such as an AC adapter or a powered docking cradle that supplements or recharges the battery.

As shown, mobile device 400 includes light emitting diode (LED) display 450, and audio interface 454. LED display 450 may be controlled to remain active for specific periods or events. For example, an LED display may stay on while the phone is powered or may light up in response to other events. Audio interface 454 is arranged to receive and provide audio signals. For example, audio interface 454 may be coupled to a speaker (not shown) to provide audio from a telephone call, a tuner, or from some other audio source. Audio interface 454 may also be coupled to an input device, such as a microphone, to receive audio input.

Figure 5:
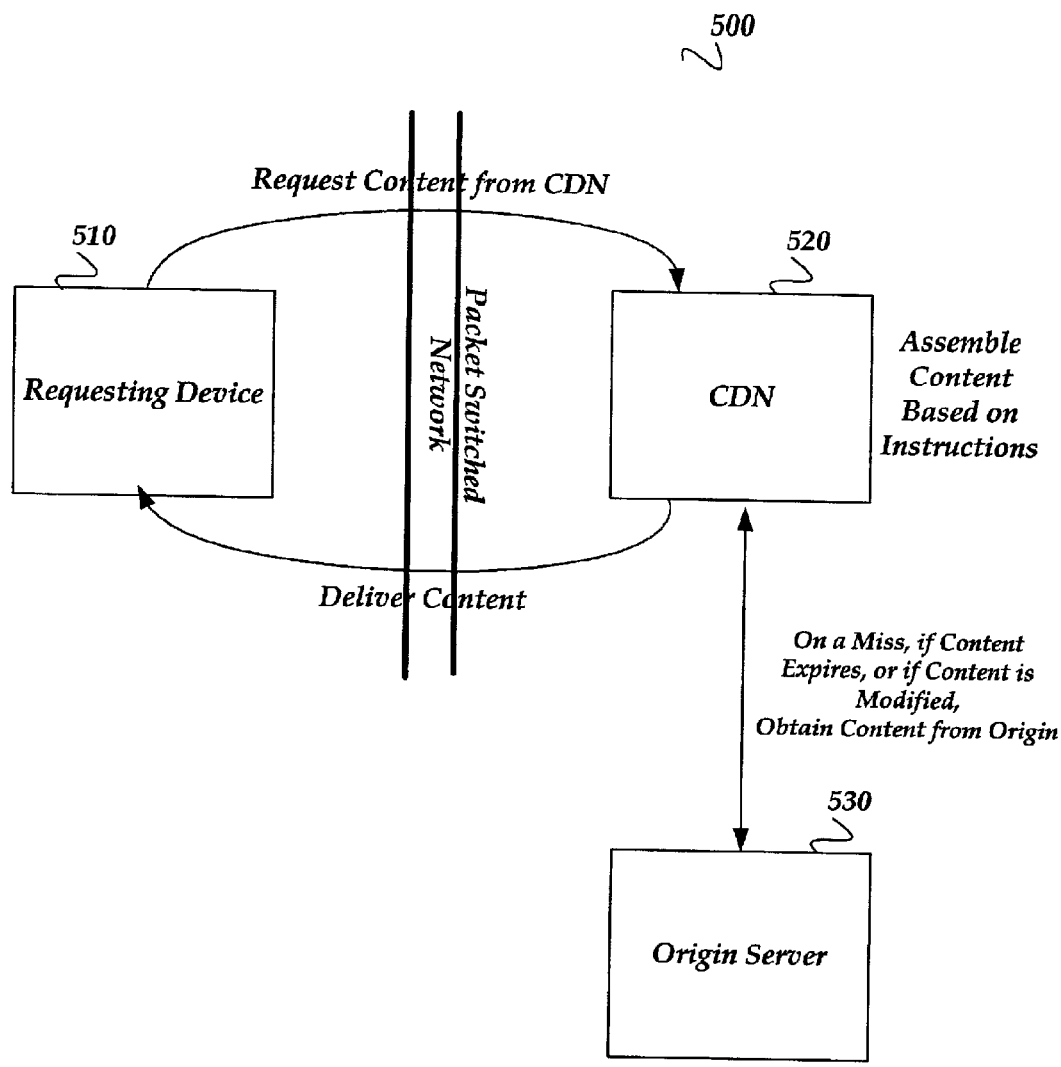
FIG. 5 illustrates a functional block diagram showing an on-demand content delivery system using a CDN.

FIG. 5 illustrates a functional block diagram showing an on-demand content delivery system using a CDN, according to one embodiment of the invention. As shown in the figure, on-demand content delivery system 500 includes requesting device 510, CDN 520, and origin server 530. Requesting device 510 and origin server 530 are coupled to CDN 520 through a network, such as a packet switched network.

Requesting device 510 requests content from a CDN. The content request may be for any type of content available from CDN 520 or origin server 530. According to one embodiment of the invention, the content request is for content associated with an adlet playlist. For example, the content may be cliplets specifically encoded for requesting device 510. CDN 520 receives the content request and attempts to assemble the content based on instructions from origin server 530. When the requested content is available, CDN 520 delivers the requested content to requesting device 510. When the requested content is not available on CDN 520, CDN 520 obtains the requested content from origin server 530. The content may not be available on CDN 520 for many reasons. For example, the requested content may be expired, new content may be available, or the requested content may not be located on CDN 520. As mentioned above, when the content is not available on CDN 520, CDN 520 obtains the content from origin server 530. The content is then maintained by CDN 520 according to the instructions regarding the content obtained from origin server 530. For example, CDN 520 may be instructed to maintain the content for some predetermined period. CDN 520 may be instructed to maintain the content for one minute, ten minutes, one day, one week, and the like. CDN 520 delivers the content to the requesting device after it has obtained the content from origin server 530.

CDN 520 may be any number of CDNs available. For example, the following is a partial list of available CDNs and competing CDN technologies that may be used in accordance with aspects of the invention. The list is not meant to be exhaustive or provide all of the details relating to the CDN. Akamai provides content delivery and streaming media services, along with global traffic management. AppStream's infrastructure monitors the usage of central databases and applications, segments them, and proactively moves the computing resources to application servers closest to the users that need them. AT&T ICDS monitors the origin Web site for changes in content and replicates the changes on mirror sites across their worldwide networks and data facilities, including an expansive cable network. Digital Island provides delivery of all major kinds of content, including streaming media, and features multiple authentication methods to provide secure content delivery. Solid-Speed uses intelligent routing and network optimization to bypass internet bottlenecks. They work to find the most efficient route between your customers and your content. Speedera's CDN pushes content from web origin sites to caching servers at the "edge" of the Internet, much closer to users. XOSoft's CDN sends only the changes of documents combining mirrors and caches to synchronize content worldwide, and deliver fresh content to users quickly. As can be seen, the available CDNs are extensive and the appropriate CDNs may be chosen based on the content being delivered to the requesting device.

Figure 6:
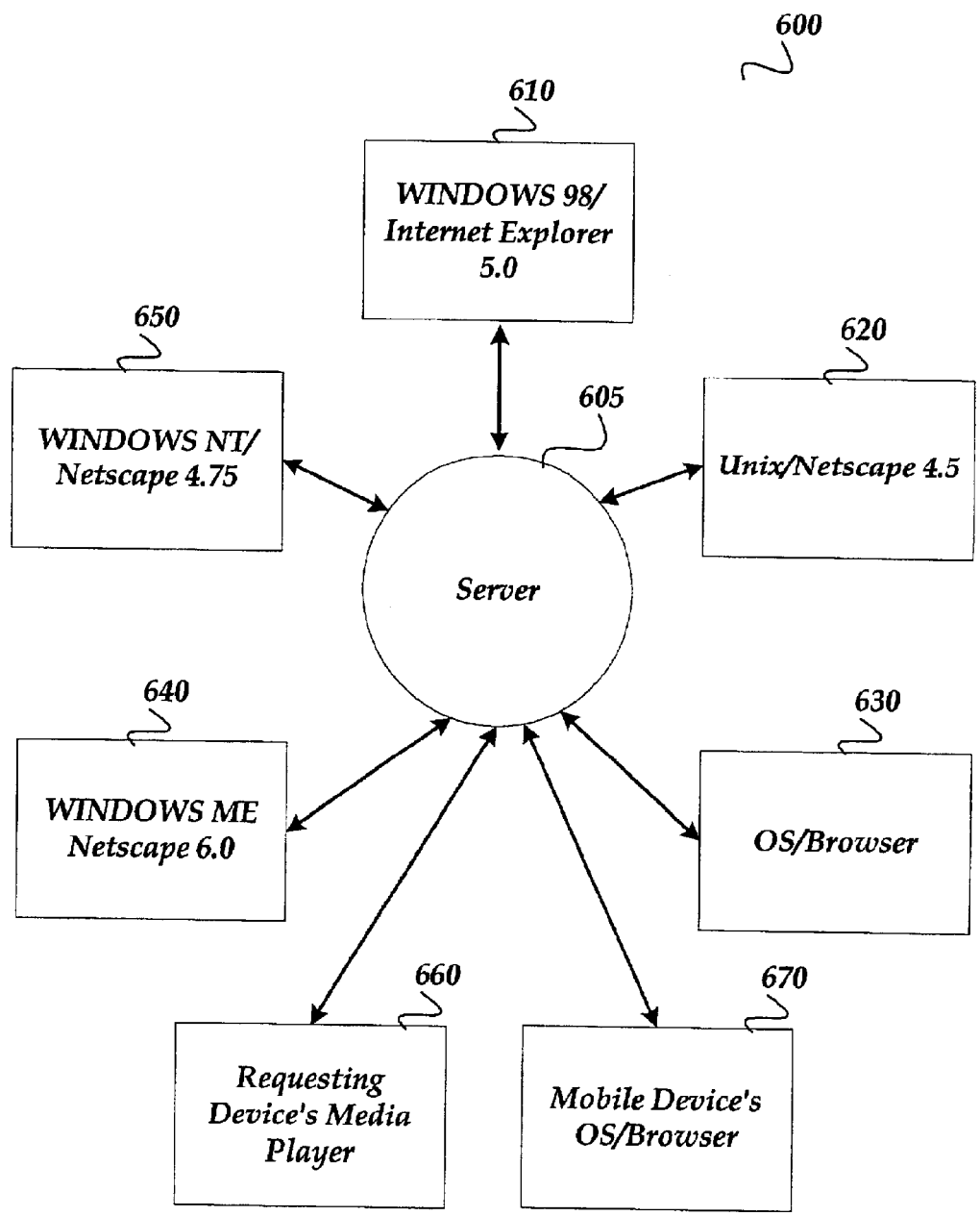
FIG. 6 illustrates a basic operating attributes inquiry system containing a set of exemplary basic attributes of requesting devices.

FIG. 6 illustrates a basic operating attributes inquiry system containing a set of exemplary basic attributes of requesting devices, according to one embodiment of the invention. Generally, basic operating attributes inquiry system 600 determines the requesting device's basic configuration including the operating system, browser, and media player used by the requesting device.

Server 605 communicates with the requesting device and receives basic configuration information in return. The configuration information is used to help optimize the requesting device's experience with the adlet. According to one embodiment of the invention, javascript code is executed on the requesting device that sends the basic attribute information to server 605.

For example, server 605 receives the operating system (OS) and browser used by the requesting device (block 630). For example, the requesting device of block 610 has a configuration using the WINDOWS 98 operating system and using the Internet Explorer 5.0 browser. The requesting device of block 620 uses the UNIX operating system and uses Netscape 4.5 as the browser. The requesting device of block 640 uses the WINDOWS ME operating system and uses Netscape 6.0 as the browser. The requesting device of block 650 uses the WINDOWS NT operating system and Netscape 4.75 as the browser. The requesting device of block 620 uses the UNIX operating system and Netscape 4.5 as the browser. The requesting device of block 670 is a mobile device. According to this embodiment, server 605 receives the mobile device's OS, browser, as well as its media player information. Similarly, server 605 receives the requesting device's media player according to one embodiment of the invention (block 660). The media player may be any media player type. For example, two popular media players include Real Player developed by Real Networks Corp. and Windows Media Player developed by Microsoft Corp. In addition to obtaining the brand of media player, server 605 also obtains the version of the media player. The media player information is used to format and encode the content to be delivered to the requesting device.

Figure 7:
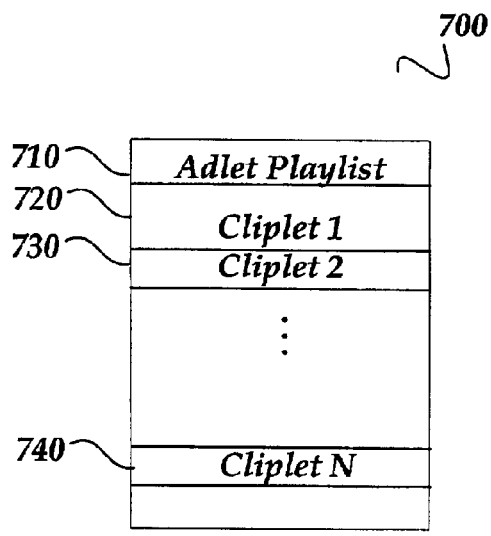
FIG. 7 illustrates an exemplary adlet playlist.

FIG. 7 illustrates an exemplary adlet playlist, according to one embodiment of the invention. Adlet playlist 700 includes a name 710, and N cliplets (720, 730, and 740). As defined above, an adlet playlist is a pointer to a playlist containing one or more cliplets. The term "clip" means a piece of raw video footage that has been edited and is waiting to be encoded into a cliplet. The term "cliplet" means clips that are further encoded to supported media player formats, bandwidths, codecs, languages and frame sizes. The term "adlet" means dynamic client objects that have different programmable functions and attributes that are used to manage a media playlist. The term "adlet playlist" means pointers to a playlist of one or more cliplets.

The adlet playlist may have as few as one cliplet, or as many as N cliplets. According to one embodiment of the invention, the cliplets within the adlet playlist are arranged in order of performance and are less than two minutes in length. It will be appreciated, however, that the cliplets may be any length. According to the particular adlet playlist shown, cliplet 1 is performed, then cliplet 2, cliplet 3, up through cliplet N in sequence. Alternatively, some other performance order could be used. For example, the cliplets could be played in reverse order, or sequencing instructions could be provided within the adlet playlist.

Figure 8A:
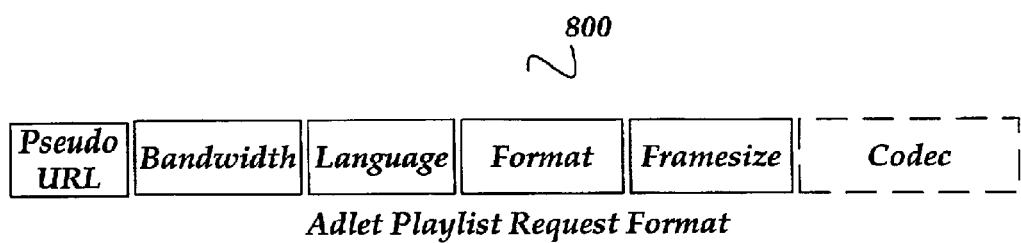
FIG. 8A shows an exemplary adlet request format.

FIG. 8A illustrates an adlet playlist request format, according to one embodiment of the invention. As shown in the figure, adlet playlist request format 800 includes a Pseudo URL, a bandwidth field, a language field, a format field, a frame size field and an optional codec field. The pseudo URL field contains information requesting a certain adlet playlist. The pseudo URL does not contain the link to the content directly. Instead, the Pseudo URL directs the requesting device to a CDN or server that generates the appropriate URL's to direct the requesting device to the content. An exemplary Pseudo URL has the following format:

//CDN/psuedourl?AdletPlaylistRequestformat

The bandwidth field indicates the bandwidth of the requesting device. According to one embodiment of the invention, the bandwidth field is one of three settings. The first bandwidth setting is less than 50 Kbps. The second bandwidth setting is the bandwidth between 50 Kbps and less than 100 Kbps. The third bandwidth setting is 100 Kbps or larger. As will be appreciated the bandwidth may be any bandwidth value, and may be the specific bandwidth of the device rather than a categorization of the bandwidth. The language field indicates the language used by the requesting device. For example, does the requesting device use English, French, Spanish, Japanese, etc. The format field indicates the preferred format for the adlet. For example, the format is for Windows Media Player, QuickTime, Real Player, and the like. The frame size field indicates the size of the desired video presentation. For example, the frame size could be full screen, half screen, quarter screen, 160 by 120 pixels, 320 by 240 pixels, x pixels by y pixels and the like. An optional codec field indicates the desired encoding format for the clips.

Figure 8B:
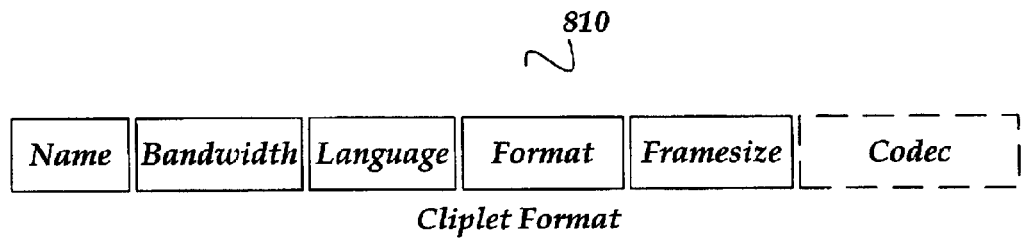
FIG. 8B shows an exemplary cliplet format.

FIG. 8B illustrates a cliplet format, according to one embodiment of the invention. As shown in the figure, cliplet format 810 includes a name field, a bandwidth field, a language field, a format field, a frame size field and an optional codec field. FIG. 8B is substantially similar to FIG. 8A, however, the name field has replaced the Pseudo URL field shown in FIG. 8A. The name field indicates the name of the cliplet. According to one embodiment of the invention, the name includes identifying information from the vendor as well as information pertaining to the content of the cliplet. The other field descriptions are as defined with reference to FIG. 8A.

Figure 9:
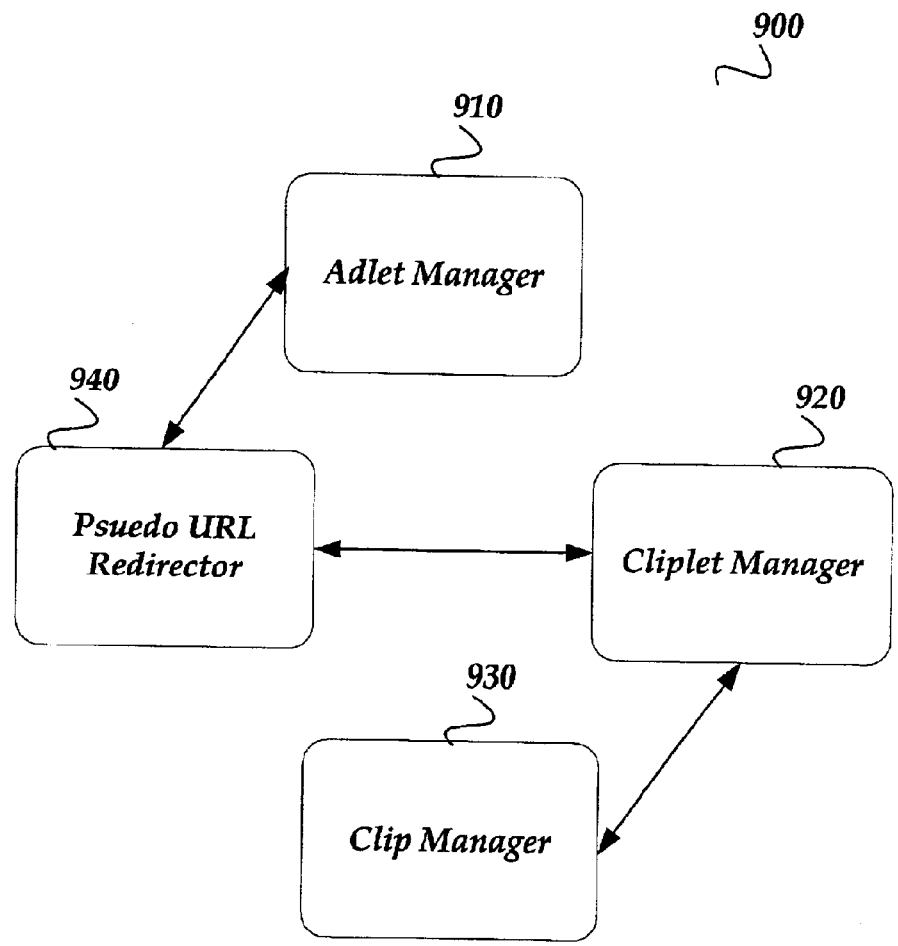
FIG. 9 illustrates an exemplary functional block diagram generally illustrating the content delivery system.

FIG. 9 illustrates an exemplary functional block diagram generally illustrating the content delivery system, according to one embodiment of the invention. As shown in the figure, content delivery system 900 includes adlet manager 910, cliplet manager 920, clip manager 930, and Pseudo URL redirector 940.

Adlet manager 910 is coupled to Pseudo URL redirector 940. Pseudo URL redirector 940 is coupled to adlet manager 910 and cliplet manager 940. Cliplet manager 920 is coupled to clip manager 930 and Pseudo URL redirector 940. Clip manager 930 is coupled to cliplet manager.

Figure 11:
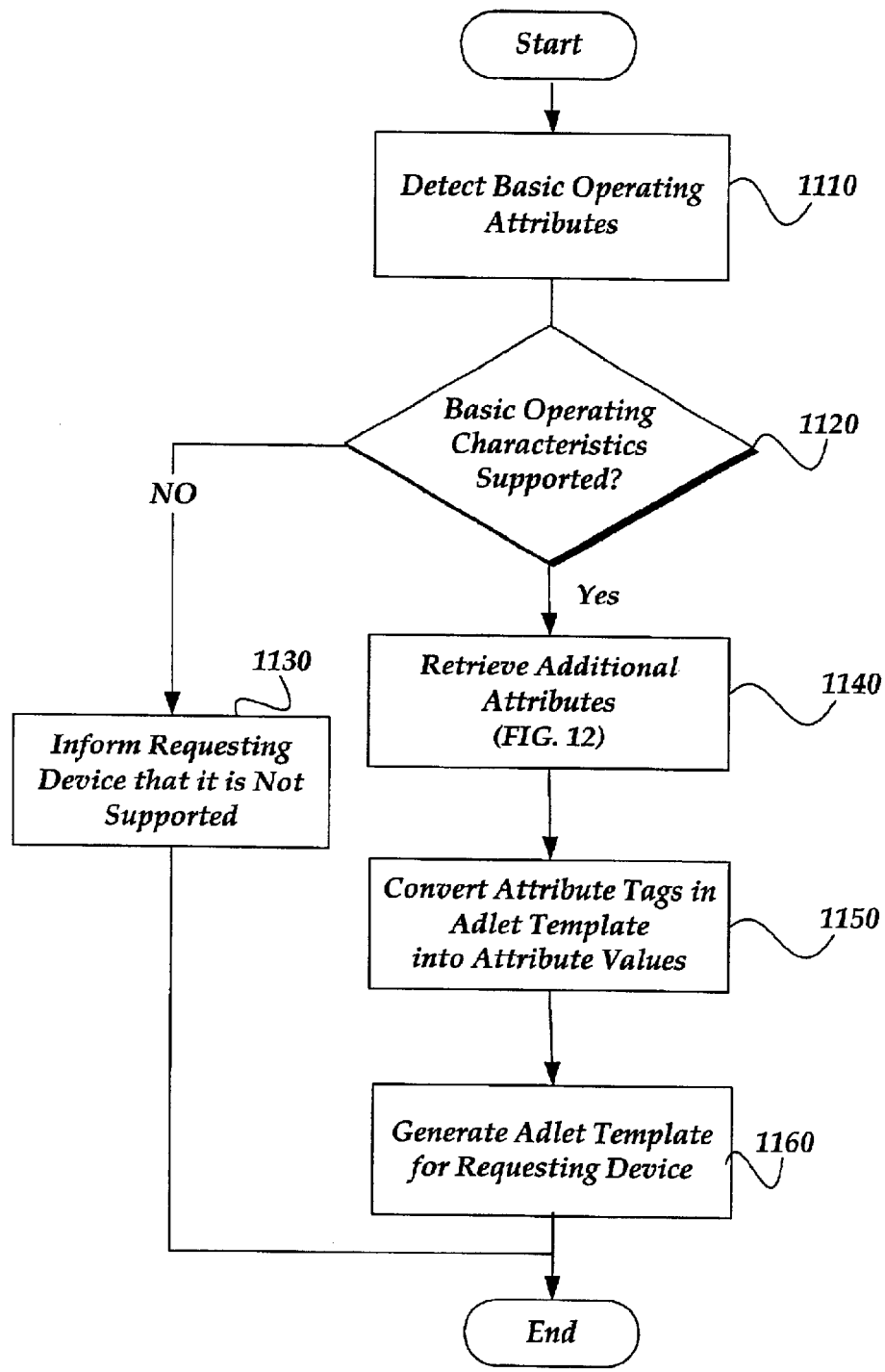
FIG. 11 shows a process for creating an adlet template optimized for a requesting device.

Adlet manager 910 creates an adlet template that optimizes the video/audio experience based on the requesting device's configuration and configures the receiving device to retrieve the content from an optimized location on the network (See FIG. 11 and related discussion).

Pseudo URL redirector 940 receives a PseudoURL from the requesting device and determines what files to include as well as what location to obtain the content based on the fields within the adlet playlist request format. For example, based on a bandwidth of less than 50 Kbps, a language of English, a frame size that is one quarter of a display, what is the best location on the network to obtain the data and what files are optimized for the requesting device. Once determined, Pseudo URL redirector hard codes the network address into the template delivered to the requesting device.

Cliplet manager 920 manages the movement and the messaging to the particular encoding system. The cliplet manager may encode the content into multiple formats or may encode the content "just in time" (JIT) to meet the requesting device's configuration. For example, cliplet manager 920 may encode the clips to be optimized for a WINDOWS 98 operating system using Windows Media Player V7.0. As will be appreciated by those of ordinary skill in the art, there are many possible encoding formats for the clips. According to one embodiment of the invention, the encoded cliplets are stored in a database and sent to a CDN and cached for a predetermined time when requested by a device. According to another embodiment, the cliplets are encoded when requested by a device.

Clip manager 930 manages the raw content. For example, the content may be in an MPEG format. According to one particular embodiment, video content is encoded in MPEG-4 format. These clips are stored in a database and are encoded by cliplet manager.

Figure 10:
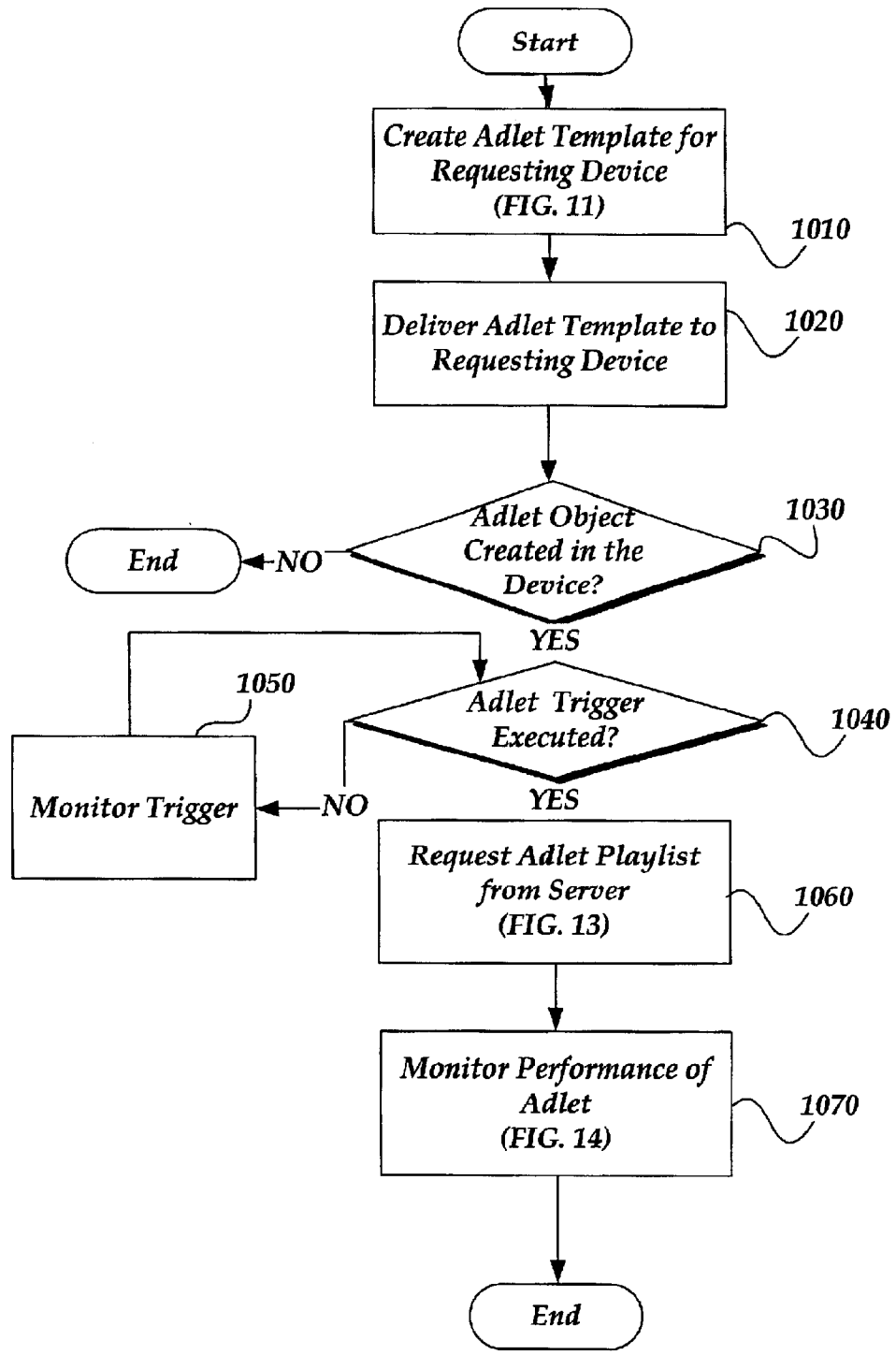
FIG. 10 illustrates an overview of the process for the on-demand content delivery system.

FIG. 10 illustrates an overview of the process for the on-demand content delivery system, according to one embodiment of the invention. After a start block, the logical flow moves to block 1010 where the process creates an adlet template for the requesting device. Generally, an adlet template contains instructions for the requesting device to retrieve and play the content, such as the content within an adlet playlist, in an optimized manner (See FIG. 11 and related discussion). Moving to block 1020 the adlet template is delivered to the requesting device. Flowing to decision block 1030 a determination is made as to whether the adlet object is created in the device. If not, the logic flows to an end block and terminates. When the object is created in the device, the logical flow moves to decision block 1040 that determines if the adlet trigger is executed. The adlet may be triggered automatically or upon the occurrence of a manual trigger, such as by selecting a button in a browser or on a web page. When the adlet is not triggered, the flow moves to block 1050 that continues to monitor the trigger. When the adlet is triggered, the process moves to block 1060 at which point the logic requests the adlet playlist from the server (See FIG. 13 and related discussion). Flowing to block 1070, the performance of the adlet is monitored. Generally, the monitoring determines if the content within the adlet playlist is executed within a predefined set of parameters by the requesting device (See FIG. 14 and related discussion).

FIG. 11 shows a process for creating an adlet template for a requesting device, according to one embodiment of the invention. After a start block, the logic flows to block 1110, where the process detects the basic operating attributes of the requesting device. The basic operating attributes of the device are used to help create the adlet template. According to one embodiment of the invention, the basic attributes include the operating system, browser, and media player used by the requesting device. As will be appreciated in view of the present disclosure, other basic attributes may be used depending on the content to deliver to the requesting device. Moving to decision block 1120, a decision is made as to whether the basic operating characteristics are supported by the on-demand content delivery system. When the operating characteristics of the requesting device are not supported, the logical flow moves to block 1130 at which point the requesting device is informed that it is not supported. When the basic operating characteristics of the requesting device are supported, the process flows to block 1140 where additional attributes are obtained from the requesting device. The additional attributes provide the system with information that allows further optimization of the delivery of the content (See FIG. 12 and related discussion). Transitioning to block 1150 the attribute tags in the adlet template are converted into attribute values. Moving to block 1160, the adlet template is generated for the requesting device. The logical flow then ends.

Figure 12:
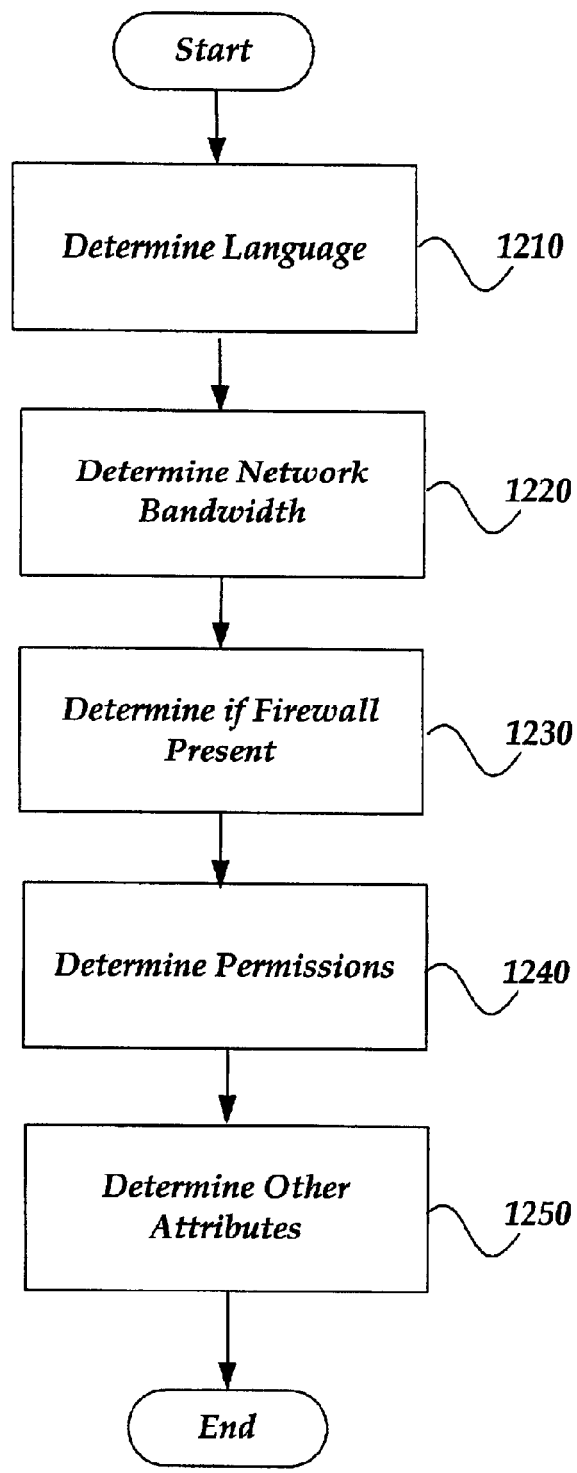
FIG. 12 illustrates a process for retrieving additional attributes from a requesting device.

FIG. 12 illustrates a process for retrieving additional attributes from the requesting device, according to one embodiment of the invention. After a start block, the logical flow moves to block 1210 where the language used by the requesting device is determined. The determined language is used to provide the requesting device with content matching their language preference. For example, if the determined language is Spanish, then the content will be delivered to the requesting device in Spanish. Similarly, if the determined language is English, then the content is delivered in English. Flowing to block 1220, the network bandwidth is determined. As will be appreciated, the network bandwidth may be determined many different ways. According to one embodiment of the invention, the bandwidth is determined automatically by performing a download test on the requesting device. The requesting device may download a very small file having a predetermined size for a given period of time. The bandwidth is determined based on the number of files successfully downloaded for the given period of time. As the network conditions may change over time, the download test may be repeated. Moving to block 1230, a determination is made as to whether a firewall is present on the requesting device. Transitioning to block 1240 permissions on the requesting device are determined. For example, permissions may be set that disable the ability to perform certain operations across a network. Moving to block 1250, other attributes are determined. Another attribute may be a protocol restrictions attribute or the other attributes may include any attributes that help to optimize content delivery to the requesting device.

Figure 13:
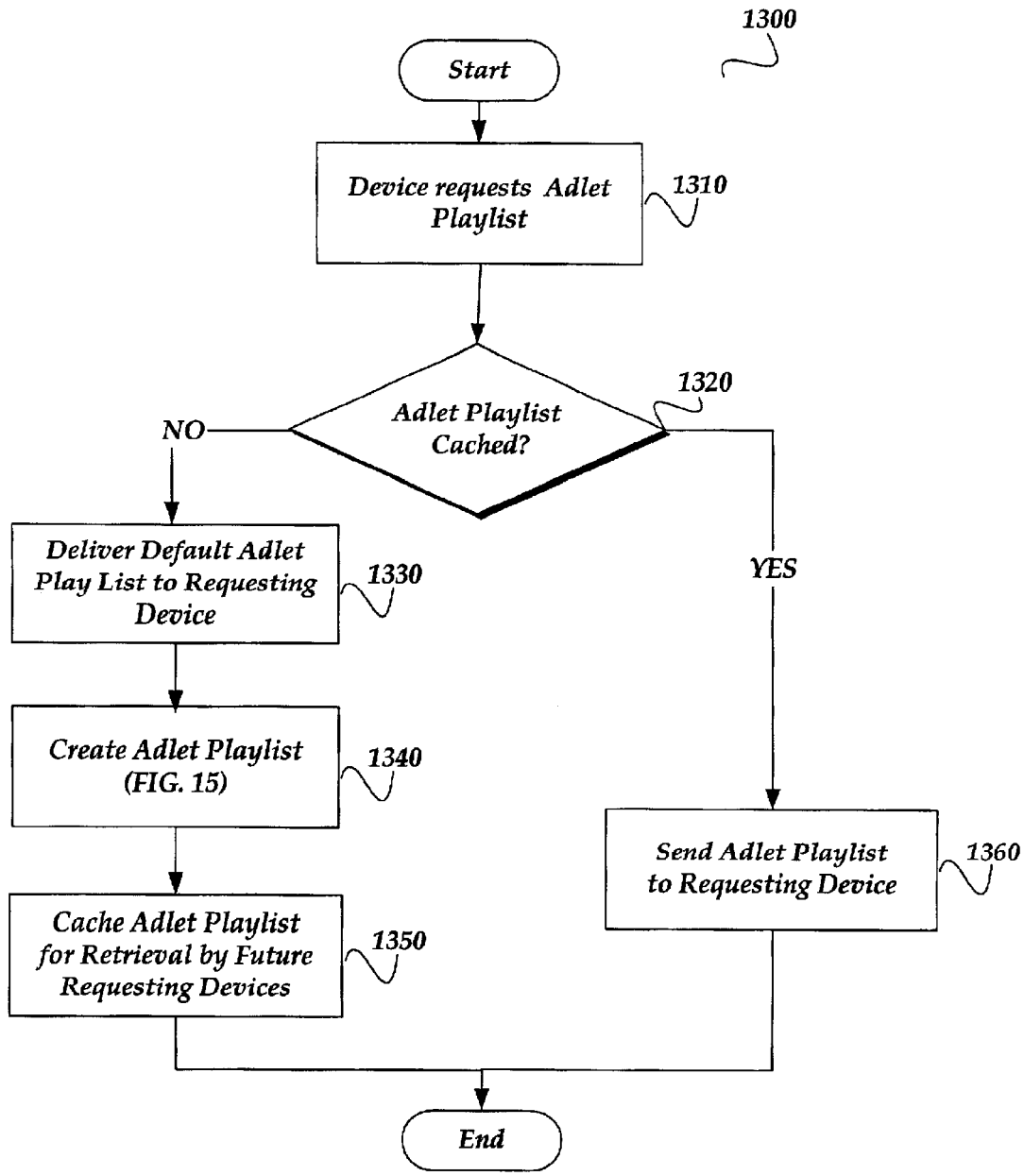
FIG. 13 illustrates the process of requesting an adlet playlist.

FIG. 13 illustrates the process of requesting an adlet playlist, according to one embodiment of the invention. After a start block, the logical flow moves to block 1310 where the device requests the adlet playlist from a CDN on the network. Moving to decision block 1320, a determination is made as to whether the adlet playlist is cached on the specified CDN. When the adlet playlist is not cached, a default adlet playlist is delivered to the requesting device (block 1330). According to one embodiment of the invention, the default adlet playlist is the closest playlist stored on the CDN that is optimized for the requesting device. The process transitions to block 1340, where the adlet playlist is created that is optimized for the requesting device (See FIG. 15 and related discussion). The created adlet playlist is then cached for future requesting devices on the CDN (block 1340). When the adlet playlist is cached, the logical flow moves to block 1350 at which point the CDN sends the requested content that is optimized to play on the requesting device. The logical flow then ends.

Figure 14:
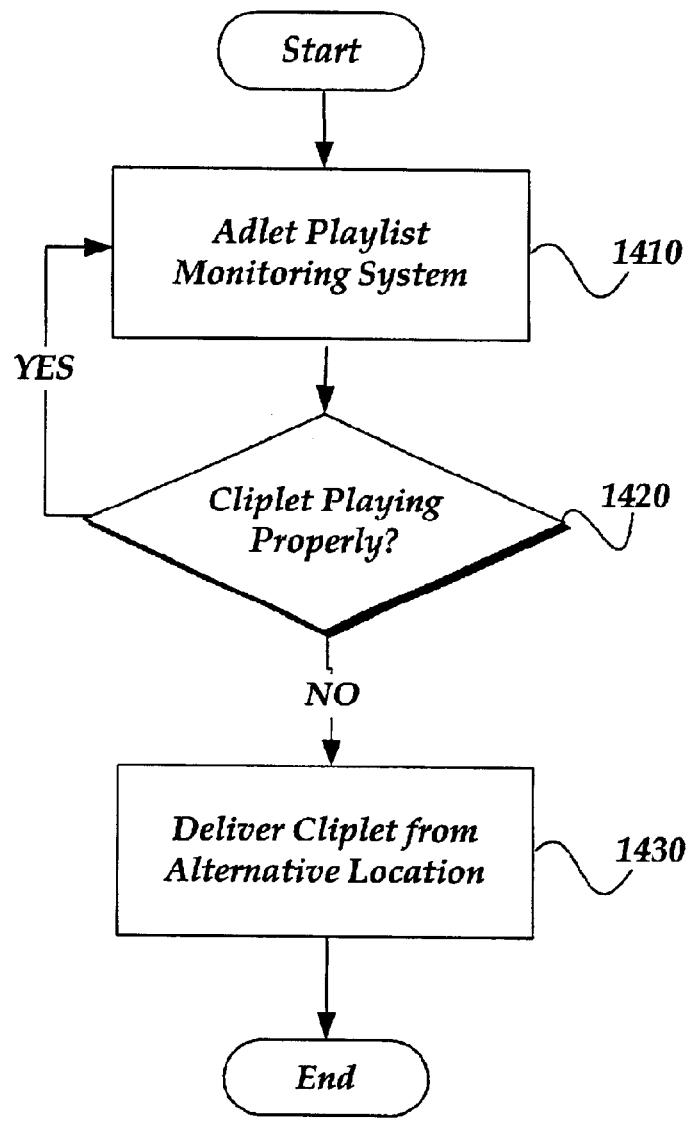
FIG. 14 shows a process for monitoring the performance of an adlet.

FIG. 14 shows a process for monitoring the performance of an adlet on a requesting device, according to one embodiment of the invention. After a start block, the logic flows to block 1410 where the adlet playlist is monitored. Moving to decision block 1420, a decision is made as to whether each cliplet within the adlet playlist is playing properly. To determine if the cliplet is playing properly the media player within the requesting device may be polled at predetermined times. For example, the media player may be polled after ten seconds to determine if the cliplet is playing properly. When the cliplet is playing properly, the logical flow returns to block 1410 to continue monitoring of the adlet playlist. When the cliplet is not playing properly the cliplet may be retrieved from an alternative location. The alternative location may be another location on the network. The cliplet is then delivered to the requesting device (block 1430) and the monitoring is continued. The logical flow then ends.

Figure 15:
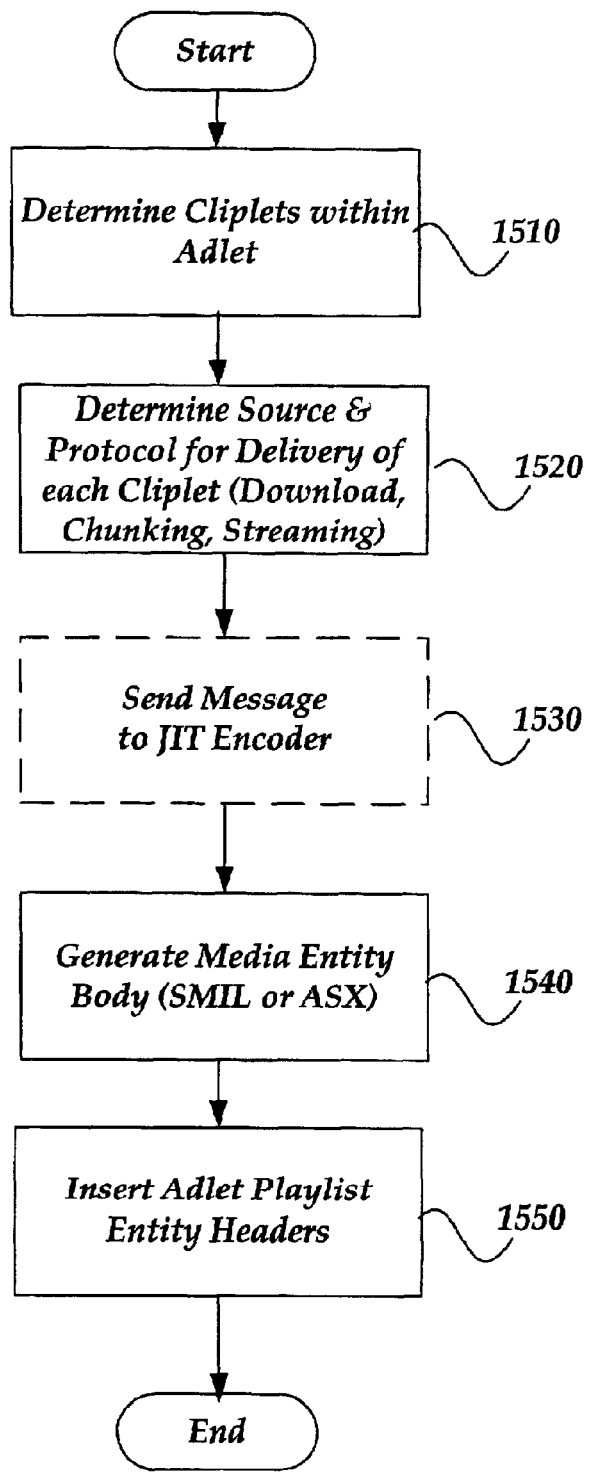
FIG. 15 illustrates a process for generating instructions for delivering the on-demand content; in accordance with aspects of the invention.

FIG. 15 illustrates a process for generating instructions for delivering the on-demand content, according to one embodiment of the invention. After a start block, the logical flow moves to block 1510 where the cliplets within the adlet are determined. The cliplets may be identified as described above with reference to FIGS. 7, 8A, and 8B.

Moving to block 1520, the source and protocol for delivery of the cliplets is determined. A determination is made as to whether the cliplet should be downloaded in full, downloaded in chunks of data, or streamed to the requesting device. The delivery method is determined from the attributes of the requesting device as well as the size of the content. For example, if the cliplet may be downloaded within a predetermined time, then the content may be downloaded in full. For example, if the cliplet may be downloaded within ten seconds then the cliplet may be downloaded in full. As will be appreciated, the time to download the cliplet depends on the bandwidth of the requesting device, latency within the network, and the file size of the cliplet. Chunking may be used when a device may receive larger amounts of data than streaming allows. According to one embodiment of the invention, the cliplets are streamed for low bandwidth requesting devices. Generally, streaming is a technique for transferring content so that it can be processed as a steady and continuous stream by the requesting device. Streaming technologies are becoming increasingly important with the growth of the commonly used because most users do not have fast enough access to download large files quickly. Using streaming, the requesting device can start displaying the data before the entire file has been transmitted. For streaming to produce a smooth presentation to the user, the requesting device must be able to collect the data and process it as a steady stream.

Flowing to block 1530, a message may be sent to the JIT encoder to encode the cliplet according to the determined attributes. The JIT encoder may encode the cliplets in real-time and deliver them to the CDN for delivery.

Next, at block 1540, the media entity body is generated to perform the cliplet on the requesting device. According to one embodiment of the invention, the media entity body is created using Synchronized Multimedia Integration Language (SMIL). According to another embodiment, the media entity body is created using ASX. Briefly described, SMIL is a markup language based on extensible Markup Language (XML) and is being developed by the World Wide Web Consortium (W3C) that enables developers to divide multimedia content into separate files and streams (audio, video, text, and images), send them to a user's computer individually, and then have them displayed together as if they were a single multimedia stream. The ability to separate out the static text and images helps to make the multimedia content much smaller so that it doesn't take as long to travel over the network. Rather than defining the actual formats used to represent multimedia data, it defines the commands that specify whether the various multimedia components should be played together or in sequence.

ASX files, on the other hand, are small text files that can always sit on an HTTP server. When the browser interprets the ASX file, it accesses the streaming media file that is specified inside the ASX file, from the proper HTTP, mms, or file server. For example, the following is an exemplary ASX file:

```
<ASX VERSION="3">
  <ENTRY>
    <REF HREF="mediaplayer://'location to access
      file"/XXXX1.asf/">
    <REF HREF="mediaplayer://"location to access
      file"/XXXX2.asf/">
  </ENTRY>
</ASX>
```

The ASX file format is very rich. For example, media, such as banners, icons, images, and watermarks may be added to the streaming media.

Flowing to block 1550, the adlet playlist entity headers are inserted. The logical flow then ends.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for delivering and monitoring an on-demand playlist over a network, comprising:

determining attributes of a requesting device;

creating a template based on the determined attributes that includes instructions to retrieve and play the playlist related to the requesting device;

delivering the template to the requesting device;

determining when a trigger associated with the playlist is executed, and when executed:

requesting the playlist from a location based on the template; and delivering the playlist to the requesting device.

2. The method of claim 1, further comprising playing the playlist and monitoring the playing of the playlist.

3. The method of claim 1, wherein determining the attributes of the requesting device, further comprises:

determining basic operating characteristics of the requesting device; and determining if the basic operating characteristics of the requesting device are supported; and if the basic operating characteristics are supported then retrieving additional attributes corresponding to the requesting device, otherwise informing the requesting device that the basic operating characteristics are not supported.

4. The method of claim 3, wherein retrieving the additional attributes corresponding to the requesting device, further comprises determining the additional attributes corresponding to a set of attributes including a language attribute, a bandwidth attribute, a firewall attribute, and a permissions attribute.

5. The method of claim 1, wherein delivering the playlist to the requesting device, further comprises:

determining if the playlist is cached; and sending the playlist to the requesting device when the playlist is cached, otherwise sending a default adlet playlist to the requesting device.

6. The method of claim 5, wherein sending the default adlet playlist to the requesting device, further comprises:

creating a cliplet based on the attributes of the requesting device, the cliplet contained within the playlist;

creating an optimized playlist corresponding to the requesting device; and caching the optimized playlist so that it may be retrieved by future requesting devices.

7. The method of claim 6, wherein creating the cliplet based on the attributes of the requesting device, further comprises:

determining a source for delivery of the cliplet; and generating media instructions that are used by the requesting device to optimally perform actions associated with the playlist.

8. The method of claim 7, wherein determining the source for delivery of the cliplet, further comprises:

determining a protocol to use to send the playlist to the requesting device; and determining the source for delivery of the cliplet based on the protocol.

9. The method of claim 8, wherein determining the protocol to use to send the playlist to the requesting device, further comprises choosing the protocol from the set including a full download protocol, a chunking download protocol, and a streaming protocol, the protocol chosen relating to a set of attributes including a bandwidth attribute and a firewall attribute.

10. The method of claim 2, wherein monitoring the playing of the playlist, further comprises:

determining if a cliplet is playing properly, and if the cliplet is playing properly, continuing to monitor the playing of the cliplet, or otherwise, delivering another cliplet to the requesting device from an alternative location.

11. A computer data signal embodied in a carrier wave having computer executable instructions embodied thereon, comprising:

determining attributes of a requesting device;

creating instructions based on the attributes that correspond to a playing of a playlist;

delivering the instructions to the requesting device;

determining when a trigger associated with the playlist is executed, and when executed:

requesting the playlist from a location based on the instructions;

delivering the playlist to the requesting device;

performing the playlist; and monitoring the playing of the playlist.

12. The modulated data signal of claim 11, wherein determining the attributes of the requesting device, further comprises:

determining basic operating characteristics of the requesting device; and determining if the basic operating characteristics of the requesting device are supported; and if the basic operating characteristics are supported then retrieving additional attributes corresponding to the requesting device, the additional attributes relating to a bandwidth and protocol restriction attribute; otherwise informing the requesting device that the basic operating characteristics are not supported.

13. The modulated data signal of claim 12, wherein delivering the playlist to the requesting device, further comprises:

determining if the playlist is cached; and sending the playlist when cached, otherwise sending a default playlist to the requesting device.

14. The modulated data signal of claim 13, wherein sending the default playlist to the requesting device, further comprises:

creating a cliplet based on the attributes of the requesting device, the cliplet contained within the playlist;

creating an optimized playlist corresponding to the attributes of the requesting device; and caching the optimized playlist so that it may be retrieved by fixture requesting devices.

15. The modulated data signal of claim 14, wherein monitoring the playing of the playlist, further comprises determining if a cliplet is playing properly, and if the cliplet is playing properly, continuing to monitor the playing of the cliplet, or otherwise, delivering another cliplet to the requesting device from an alternative location.

16. A system for delivering and monitoring an on-demand playlist over a network, comprising:
   a processor and a computer-readable medium;
   an operating environment stored on the computer-readable medium and executing on the processor;
   a communication connection device coupled to the operating environment;
   a media device coupled to the operating environment and operative to perform actions, including:
   determining attributes of a requesting device;
   creating instructions based on the attributes that correspond to a playing of the playlist;
   delivering the instructions to the requesting device;
   determining when a trigger associated with the playlist is executed, and when executed:
      determining a location from which to deliver the playlist;
      delivering the playlist;
      playing the playlist; and
      monitoring the playing of the playlist.

17. The system of claim 16, wherein determining the attributes of the requesting device, further comprises:
   determining basic operating characteristics of the requesting device; and
   determining if the basic operating characteristics of the requesting device are supported; and if the basic operating characteristics are supported then retrieving additional attributes corresponding to the requesting device, the additional attributes relating to a bandwidth attribute and protocol restriction attribute; otherwise informing the requesting device that the basic operating characteristics are not supported.

18. The system of claim 17, wherein delivering the playlist to the requesting device, further comprises:
   determining if the playlist is cached; and
   sending the playlist when cached, otherwise sending a default playlist to the requesting device.

19. The system of claim 18, wherein sending the default adlet to the requesting device, further comprises:
   creating a default cliplet based on the attributes of the requesting device;
   creating the default playlist corresponding to the requesting device; and
   sending the default playlist.

20. The system of claim 19, wherein monitoring the playing of the playlist, further comprises determining if a cliplet is playing properly, and if the cliplet is playing properly, continuing to monitor playing of the cliplet, or otherwise, delivering another cliplet to the requesting device from an alternative location.

* * * * *

UNITED STATES PATENT AND TRADEMARK OFFICE
CERTIFICATE OF CORRECTION

PATENT NO. : 6,925,495 B2
APPLICATION NO. : 09/905738
DATED : August 2, 2005
INVENTOR(S) : Hegde et al.

It is certified that error appears in the above-identified patent and that said Letters Patent is hereby corrected as shown below:

On the Title page, in field (57), under "Abstract", in column 2, line 2, delete "their" and insert -- its --, therefor.

In Sheet 1 of 15, FIG. 1, below Reference Numeral 115, delete "400".

In column 4, line 40, delete "network ("WAN") 230" and insert -- network ("WAN") 230 are --, therefor.

In column 4, line 57, delete "remote computer 240" and insert -- remote computers 240 --, therefor.

In column 6, line 42, delete "328" and insert -- 338 --, therefor.

In column 7, line 19, delete "devices" and insert -- device --, therefor.

In column 7, line 22, delete "328" and insert -- 338 --, therefor.

In column 7, line 23, delete "328" and insert -- 338 --, therefor.

In column 7, line 47, delete "power" and insert -- power supply --, therefor.

In column 7, line 49, delete "LED 450, audio" and insert -- LED display 450, audio interface --, therefor.

In column 8, line 49, delete "dialing" and insert -- dialing keypad --, therefor.

In column 8, line 52, delete "users" and insert -- user's --, therefor.

In column 9, line 42, delete "Akamai" and insert -- Akamai Technologies, Inc., Cambridge, MA --, therefor.

In column 9, line 44, delete "AppStream's infrastructure" and insert -- AppStream's infrastructure (AppStream Inc., Palo Alto, CA) --, therefor.

UNITED STATES PATENT AND TRADEMARK OFFICE
CERTIFICATE OF CORRECTION

PATENT NO. : 6,925,495 B2
APPLICATION NO. : 09/905738
DATED : August 2, 2005
INVENTOR(S) : Hegde et al.

It is certified that error appears in the above-identified patent and that said Letters Patent is hereby corrected as shown below:

In column 9, line 47, delete "AT&T ICDS" and insert -- AT&T ICDS (AT&T Inc., Dallas, TX) --, therefor.

In column 9, line(s) 50–51, delete "Digital Island" and insert -- Digital Island Communications, New Zealand --, therefor.

In column 9, line(s) 53–54, delete "SolidSpeed" and insert -- SolidSpeed Networks, Inc., Ann. Arbor, MI --, therefor.

In column 9, line 57, delete "Speedera's CDN" and insert -- Speedera's CDN (Speedera Networks, Santa Clara, CA) --, therefor.

In column 9, line 59, delete "XOSoft's CDN" and insert -- XOSoft's CDN (XOSoft, Inc., Farmingham, MA) --, therefor.

In column 12, line 66, delete "1150" and insert -- 1150, --, therefor.

In column 13, line 24, delete "1240" and insert -- 1240, --, therefor.

In column 13, line 29, delete "attribute or the other" and insert -- attribute. The other --, therefor.

Signed and Sealed this

Twenty-third Day of June, 2009

JOHN DOLL
*Acting Director of the United States Patent and Trademark Office*